(No Model.)
G. B. N. DOW.
CHECK REIN HOOK.
No. 348,194. Patented Aug. 31, 1886.
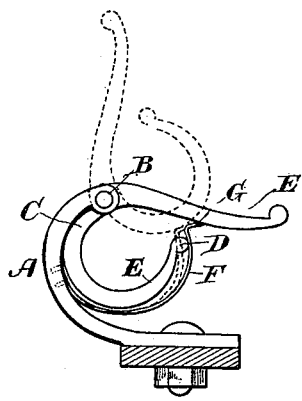
WITNESSES:
A. D. Harrison
H. Brown.
INVENTOR:
Geo. B. N. Dow
by Wright, Brown & Crosby
Attys.

UNITED STATES PATENT OFFICE.

GEORGE B. N. DOW, OF MANCHESTER, N. H., ASSIGNOR, BY MESNE ASSIGN-
MENTS, TO THE GRANITE STATE PLATING COMPANY, OF SAME PLACE.

CHECK-REIN HOOK.

SPECIFICATION forming part of Letters Patent No. 348,194, dated August 31, 1886.

Application filed December 12, 1885. Serial No. 185,494. (No model.)

*To all whom it may concern:*

Be it known that I, GEORGE B. N. DOW, of Manchester, in the county of Hillsborough and State of New Hampshire, have invented certain new and useful Improvements in Check-Rein Hooks for Harness, of which the following is a specification.

My invention relates to hooks for harness-straps—such as check-reins, &c.—and has for its object to provide a check-rein hook of the character mentioned, whereby the rein may be held in position with requisite security when it is desired to have it confined therein, and be readily and easily released when occasion may require.

To the foregoing ends my invention consists in a hook of the class noted, comprising a standard or support, a hook hinged thereto, and a spring constructed and arranged to lock the hook in its operative or closed position and confine the rein or strap therein and serve as a guard to prevent the latter from being unintentionally detached therefrom, and at the same time permit the hook to be turned on its pivot to release the rein or strap when for any cause an operation of that nature is desired.

In the drawing accompanying and forming a part of my specification the figure represents a side view of my check-rein hook.

A represents a standard or support provided at one end with means whereby it may be secured to the harness-saddle, and having at its other end a hole or eye, B, to which, at any proper point, the hook C is pivoted by means of a pin passing through said hole or eye B and through a like hole in the hook, or said parts may be pivoted or hinged together in any suitable way. One end, D, of one of the arms E E of said hook, which arms may be of any proper shape or design, is so formed as to be engaged by a spring, F, adapted to be secured to the standard or support A or to the harness-saddle.

The construction and arrangement of the parts mentioned are such that when the hook C is turned to its operative position, as represented by full lines, the end D thereof will have engaged and passed by the curved end G of the spring F, and be thus held and locked in position, the resiliency of the spring permitting of this operation in a way that will be readily understood. The curved end G of the spring extends beyond the end D of that arm of the hook with which it engages, and serves as a guard between the two ends of the two arms of the hook to prevent the rein or strap from being unintentionally detached or dislodged therefrom, the arms of the hook and the spring completely surrounding or encircling the rein or strap at the point where it is engaged thereby. It will be understood of course that the draft of the rein or strap when the same is in use will be against the inner face of that arm of the hook which rests against the standard A. When it is desired to remove the rein or strap from the hook, the latter is turned on its pivot to the position represented by dotted lines in the drawing, a little effort only being necessary to overcome the force of the spring and permit this to be done.

It is obvious that the form of my device may be changed and the parts variously arranged without departing from the spirit of the invention.

Having thus described my invention and the best way now known to me for carrying the same into effect, I claim—

1. A check-rein hook for harness, consisting of the standard A, a hook hinged thereto, a spring adapted both to lock said hook in its closed position and as a guard between the open ends of the hook to prevent the rein under ordinary circumstances from becoming dislodged from the hook, as set forth.

2. The combination of the standard A, the hook C, hinged thereto, said hook being provided with the arms E E, and the spring F, adapted to lock said hook in its closed position, and when in this position to have its free end extend between the open ends of the hook to prevent the rein or strap under ordinary circumstances from becoming dislodged from the hook, as set forth.

In testimony whereof I have signed my name to this specification, in the presence of two subscribing witnesses, this 8th day of December, 1885.

GEORGE B. N. DOW.

Witnesses:
W. C. BERRY,
E. H. CARPENTER.